United States Patent

Casper et al.

[11] Patent Number: 5,268,073
[45] Date of Patent: Dec. 7, 1993

[54] CONTINUOUS PROCESS FOR CONCENTRATING SOLUTIONS CONTAINING SALTS AND RESINS

[75] Inventors: Clemens Casper; Jörgen Weinschenck, both of Krefeld, Fed. Rep. of Germany

[73] Assignee: Bayer Aktiengesellschaft, Leverkusen, Fed. Rep. of Germany

[21] Appl. No.: 957,678

[22] Filed: Oct. 7, 1992

Related U.S. Application Data

[63] Continuation-in-part of Ser. No. 933,012, Aug. 20, 1992, abandoned, which is a continuation of Ser. No. 674,210, Mar. 25, 1991, abandoned.

[30] Foreign Application Priority Data

Apr. 7, 1990 [DE] Fed. Rep. of Germany ....... 4011380

[51] Int. Cl.$^5$ ............................................. B01D 1/02
[52] U.S. Cl. .................................... 159/47.1; 159/2.1; 159/16.3; 159/28.4; 159/47.3; 159/DIG. 13; 202/237; 202/241; 202/173; 203/4; 203/7; 203/47; 203/88; 528/501
[58] Field of Search ............... 159/28.4, 26.1, 26.2, 159/27.1, 27.2, 2.1, 47.1, 47.3, 16.3, 49; 202/237, 241, 176, 173; 203/7, 39, 41, 47, 4, 88, 91; 528/501

[56] References Cited

U.S. PATENT DOCUMENTS

| | | | |
|---|---|---|---|
| 2,467,769 | 4/1949 | Morrow et al. | 159/2.1 |
| 3,195,613 | 7/1965 | Hawkins | 159/47.1 |
| 3,453,184 | 7/1969 | Gemassmer et al. | 159/2.1 |
| 3,550,669 | 12/1970 | Lippert et al. | 159/6 |
| 3,696,003 | 10/1972 | Fitch et al. | 203/1 |
| 3,800,845 | 4/1974 | Scoggin | 159/2.1 |
| 3,833,480 | 9/1974 | Bidard | 203/88 |
| 3,956,060 | 5/1976 | Scoggin | 159/47.1 |
| 4,232,134 | 11/1980 | Schmidt et al. | 525/506 |
| 4,269,664 | 5/1981 | Younger | 203/DIG. 1 |
| 4,430,156 | 2/1984 | Casper et al. | 159/28.4 |
| 4,533,432 | 8/1985 | Goldman et al. | 159/47.1 |
| 4,947,983 | 8/1990 | Jost | 159/28.4 |
| 4,976,825 | 12/1990 | Iwasaki et al. | 159/47.1 |

FOREIGN PATENT DOCUMENTS 0011183 5/1980 European Pat. Off. .
3135787 3/1983 Fed. Rep. of Germany .
1457032 12/1976 United Kingdom .

OTHER PUBLICATIONS

Soviet Patent Abstracts, Derwent Publications Ltd.; week 9202, class J, AN 92014672; & SU-A-1643029 (Thermotch Res Inst) Feb. 1992.

Primary Examiner—Wilbur Bascomb, Jr.
Attorney, Agent, or Firm—Connolly & Hutz

[57] ABSTRACT

In concentrating solutions containing 1 to 10% by weight of salts and resins, the yield and economics and trouble-free running can be improved by using a flow tube which has a steady curvature at least in the last third and is sized in its diameter in such a way that the mean flow velocity at the tube outlet is at least 50 m/second, and at least 90% by weight of the vaporizable components are evaporated off at driving temperature gradients of 20° to 200° C. between the heating medium and the solution.

19 Claims, 2 Drawing Sheets

CONTINUOUS PROCESS FOR CONCENTRATING SOLUTIONS CONTAINING SALTS AND RESINS

CROSS-REFERENCE TO RELATED APPLICATIONS

This application is a continuation-in-part of U.S. patent application Ser. No. 07/933,012, now abandoned filed on Aug. 20, 1992, in the names of Clemens Casper et al., and entitled "CONTINUOUS PROCESS FOR CONCENTRATING SOLUTIONS CONTAINING SALTS AND RESINS". U.S. patent application Ser. No. 07/933,012 was a continuation application of U.S. patent application Ser. No. 07/674,210, now abandoned filed Mar. 25, 1991, in the names of Clemens Casper et al. and entitled "CONTINUOUS PROCESS FOR CONCENTRATING SOLUTIONS CONTAINING SALTS AND RESINS". U.S. patent applications Ser. Nos. 07/933,012 and 07/674,210, as well as the present continuation-in-part application, claim priority under 35 U.S.C. §119 of application Ser. No. P 40 11 380.9 filed on Apr. 7, 1990, in Germany.

BACKGROUND OF THE INVENTION

The invention relates to a process for concentrating solutions containing 1 to 10% by weight of salts and resins.

In the preparation of organic products, residual solutions which contain 1 to 10% by weight of salts and resins frequently arise in the reaction chamber or in the subsequent purification processes. These residues are reprocessed, on the one hand, in order to recover the product or the solvent and, on the other hand, to minimize the waste which must be incinerated.

Examples of products which frequently have to be subjected to such concentrating are chlorobenzene, tolamine, metamine, orthamine, alphamine, cresol, sodium benzothiazole, ciprofloxacin, polyphenylene sulphide, sodium methylencaprolactam, diisocyanates, benzothiazyl-2-sulphen-morpholide and benzothiazyl-2-dicyclohexyl-sulphenamide.

A feasible process principle here is the evaporation process, since the re-usable products in general have a substantially higher vapor pressure than the wastes. However, this raises considerable problems in the process sequence, since 90 to 99% by weight of the residual solution must be evaporated, the liquid phase becomes viscous/pasty towards the end of the process, the salt precipitates and leads to hard crusts on the heated walls and, with increasing concentration, the temperature rises, the heat transfer deteriorates and further polymerization can occur, which causes a further increase in viscosity, means a product loss and additionally intensifies the tendency of the solution to form crusts or thick pastes which will not flow easily.

Discontinuous processes in a stirred kettle and in the still (VDI-Nachrichten 1983, page 10) or ladle are general state of the art. In some cases, circulation evaporators are also provided upstream of the vessels, but the degree of concentrating in these is only low because of the large circulation. These discontinuous processes have quite a number of disadvantages, since a discontinuous procedure always involves high operating costs and pollutes the environment. The entire charge reaches the highly viscous phase at high temperatures at the same point in time. Large forces must be applied for thoroughly mixing the system. In spite of the thorough mixing, the heat transfer is very poor, which means a long residence time of the product in this state. Therefore, further polymerizations frequently occur in these types of apparatus and, together with the precipitated salt, they lead to intensive formation of crusts and frequently require removal of the crusts by mining techniques.

Finally, these are open distillation processes, that is to say the temperatures in the end phase are substantially higher than in a closed process.

Because of the many disadvantages in discontinuous operation, continuous processes are desired. In addition to the cost advantage, continuous processes also have the advantage that always only a small part of the product is in the critical state of the highly viscous phase at the time. Moreover, continuously operated types of apparatus are closed systems, so that the product temperatures are always lower than in discontinuously operated types of apparatus.

A continuously operating apparatus which is widely used for such purposes is the thin-layer evaporator (Chemische Rundschau 1982, page 19). In this case, the solution is charged at the top to the inside of a wide tube and centrally arranged wipers ensure that a film is formed on the wall. The solution evaporates as it runs downwards through the apparatus. The vapor is taken off at the upper end and the liquid product at the lower end of the tube. The wipers also ensure that no thick crusts can form on the heated tube walls. However, the thin-film evaporator also has some disadvantages, since the investment costs are high, it is susceptible to faults because of the rotating parts and product splashes deposit on the wiper blades and cake thereon, so that the apparatus must be cleaned at certain intervals.

SUMMARY OF THE INVENTION

It is the object of the present invention to improve the process with respect to the yield, the economics and trouble-free operation.

This object is achieved when, in a heated single-tube apparatus operated in single pass, in which the flow tube has a steady curvature (e.g., the flow tube has a coiled geometry which can alternatively be described as helical or spiral in nature) at least in the last third of its overall length and is sized in its diameter in such a way that the mean flow velocity at the tube outlet is at least 50 m/second, at least 90% by weight of the vaporizable component(s) in an original or starting solution containing salts, resins and at least one vaporizable component are evaporated off at driving temperature gradients of 20° to 200° C. between the product and the heating medium.

Preferably, the velocity at the tube outlet should be the velocity of sound. However, it is acceptable to use velocities at the tube outlet which are less than the velocity of sound in the process of the present invention.

DETAILED DESCRIPTION OF THE INVENTION

Figure 1:
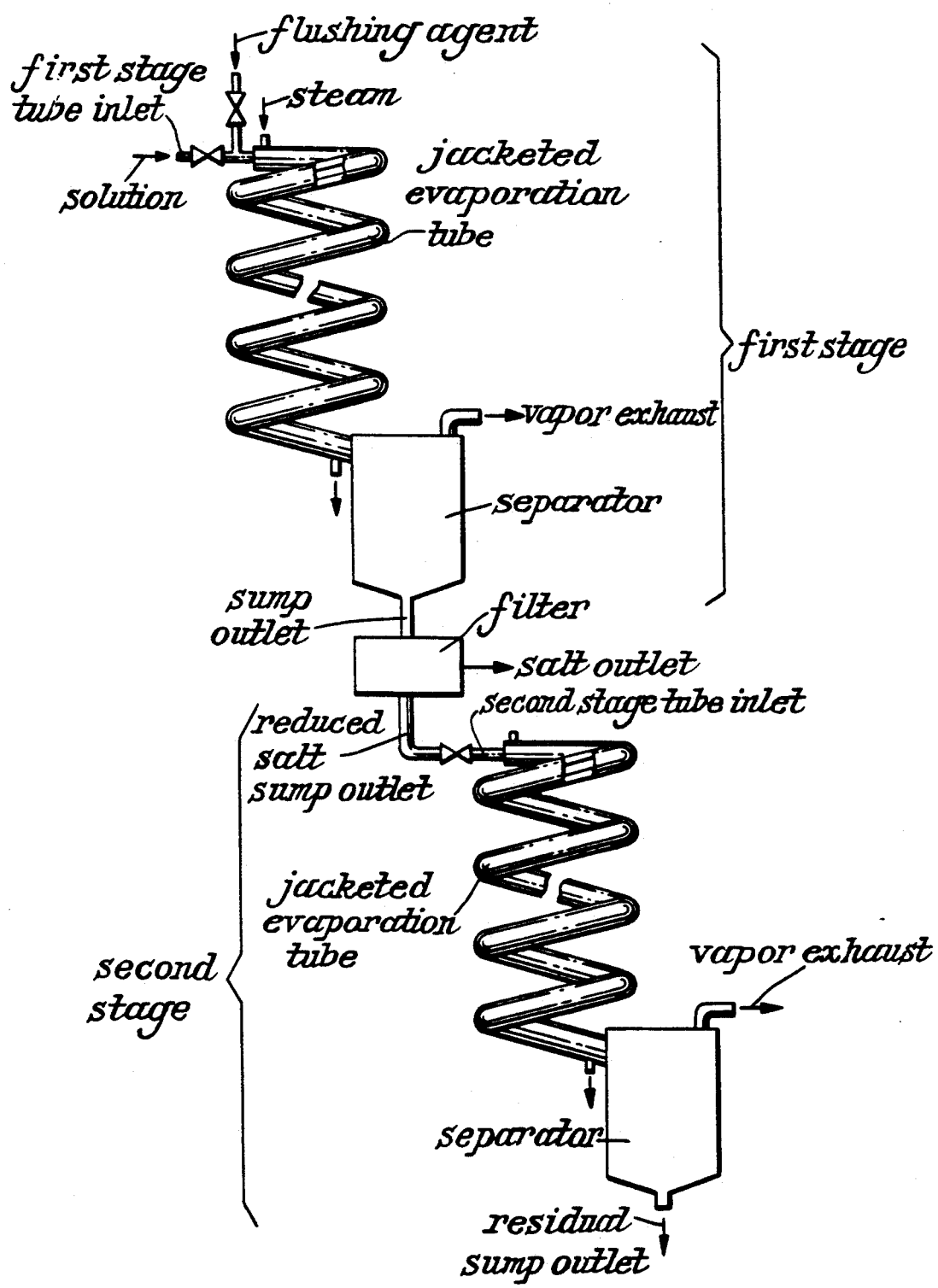

It is astounding that, in a flow tube operated in single pass, the separation process can be carried through to such an extent. In fact, according to the flow diagram of D. Baker (Oil Gas Journal 53 (1954) 12; pages 185 to 195), it must be assumed that, at these high flow velocities and with the high vapor fractions, dispersion flow forms in the last part of the tube, the liquid phase being distributed in the form of droplets in the gas stream. In this case, the wall would be wetted by the vapor and thus be heat-insulated, the droplets would flow through this part at the high gas velocity and for the major part be carried over by the vapor stream in the downstream separator. Surprisingly, however, the dispersion flow is prevented by the steady curvature of the tube. Liquid which is carried over into the gas stream is rapidly reprecipitated on the inner wall of the tube due to the centrifugal forces and surface forces, so that a coherent liquid stream and wetting of the heated tube wall always remain preserved. The result of this phenomenon is that a liquid film, covering the inner wall of the tube, is maintained up to the end of the tube. This liquid film exits the end of the tube in liquid form and contains the salts and resins that were present in the original or starting solution. The resins remain in liquid form while in the flow tube due to the temperatures used in the process.

When the process of the present invention is carried out in a single flow tube (i.e., a "one-stage" process) it is necessary that the resin alone or a combination of the resin and residual solvent form a liquid phase, dominating the solid phase, over the complete length of the tube. For example, if this were not the case, crusts and/or solid pastes would build-up in the flow tube when enough of the vaporizable component(s) had been evaporated off so that the solid phase dominated over the liquid phase.

In certain situations, for example when the amount of salts in the original solution is greater than the amount of resins, it may be necessary to use more than one flow tube (i.e., a "multi-stage" process) in the process of the present invention. For example, two or more flow tubes may be arranged in series with a mean(s) for extracting at least a portion of the precipitated salt (i.e., the salt that precipitated out of solution in the preceding flow tube) between the stages. By using such a multi-stage process, it is possible to ensure that the solid phase is dominated by the liquid phase over the complete length of each flow tube (or stage). The liquid which exits from the end of the last flow tube in the series will contain salts, resins and 10% or less by weight of the vaporizable component(s) that were contained in the original solution.

It is surprising that in general no permanent crusts form on the inner walls of the flow tube. In fact, at the high driving temperature gradients, the salts in conjunction with the resins strongly tend to form crusts, especially if further polymerization also takes place. This crust formation is largely prevented in the first place by the high flow velocities and the high shear forces thus generated on the wall.

If transient caking nevertheless occurs, a back-pressure builds up in front of the constricted point in the single-tube apparatus operated in single pass, and the flow resistance in the constricted flow cross-section increases. This is associated with an increase in the wall shear forces, which rise until they are greater than the adhesion forces, and this leads to the crusts being detached from the wall.

In some extreme cases, the shear forces cannot overcome the adhesion forces. In order to avoid this situation, it is possible to use the multi-stage process described above wherein the original solution is first evaporated down to a thin mobile suspension in a first stage. The liquid product exiting the end of the first stage contains precipitated salts. At least a portion of these salts are then filtered off by a mean(s) located between the first stage and a second stage. The filtered liquid product is then concentrated further in the second stage and this process is continued through a series of stages (flow tubes) until the desired amount of vaporizable components have been removed from the original solution. It is important to note that when a multi-stage process is used in the process of the present invention, the vapor component exiting each stage (flow tube) is separated from the liquid component in a separator located between the stages (flow tubes). After the liquid and vapor components have been separated in the separator, the vapor component is discharged separately from the liquid component which, after any necessary filtering, is further concentrated in the next stage (flow tube). Thus, only the liquid component from the preceding stage is permitted to enter the following stage.

For example, in a two-stage (two flow tube) process at least a portion of the vaporizable components in the original solution may be initially evaporated in the first stage. A part of the salts thus precipitates, and at least a portion of those precipitated salts can then be removed from the liquid product which exits the first stage by a filtration. In the second stage, the filtered liquid product is additionally concentrated to the required end concentration. Preferably, 50 to 70% by weight, or more, of the vaporizable components in the original solution are initially evaporated in the first stage.

Another or additional method of preventing or removing crust build up on the inner walls of the flow tube is, with continued heating, briefly to introduce a flushing agent (e.g., water and/or steam) at time intervals into the single-tube apparatus and to evaporate at least a portion of it therein.

For this purpose, a flushing line is arranged at the tube inlet. If crusts form in the flow tube, which manifests itself in a decrease in the quantity of heat transferred and in a pressure build-up in the tube, the system is briefly changed over to the flushing line for 30 to 60 seconds. The flushing agent flows through the flow tube for this time and dissolves the crust. Simultaneously, at least a portion of the flushing agent evaporates, since the tube heating is not switched off during the flushing time. In most situations, the feed of the original solution is interrupted during the flushing step.

Depending on the original solution that is being processed, and the processing conditions, the amount of the flushing agent that is evaporated in a single pass through the flow tube can vary from only a small portion of the amount of flushing agent introduced into the flow tube, to all of the flushing agent introduced into the flow tube. When only a portion of the flushing agent is evaporated in a single pass through the flow tube, the remainder of the flushing agent exits the flow tube as a liquid. When a significant amount of the flushing agent exits the flow tube as a liquid, it may be desirable to recirculate the liquid product exiting the flow tube (which during flushing, includes the unevaporated flushing agent and small quantities of the unevaporated vaporizable components of the original solution as well as small quantities of the salts and resins) to the inlet of the flow tube during the flushing step. In this manner, the recirculated liquid product acts as additional flushing agent during the flushing step. Alternatively, the unevaporated flushing agent can be separated from the liquid product in a further evaporation step or, if the presence of the flushing agent in the liquid product exiting the flow tube is not detrimental to the concentration process, the flushing agent can simply remain in the liquid product. In certain situations, it may be desirable during the flushing step to have the liquid product and/or vapor product exit the flow tube at a point which is located before the end of the flow tube.

The flushing agent which is evaporated in the flow tube can be discharged separately from, or together with, the other evaporated components. If necessary or desirable, the evaporated flushing agent may be separated from the other evaporated components in a separate step after the evaporated components have exited the flow tube.

The process of the present invention avoids pressure changes in the flow tube wherever possible. Such pressure changes normally occur, as described above, when crusts form on the inner surfaces of the flow tube. In a preferred embodiment of the present invention the conditions in the flow tube are maintained so as to prevent crust formation. In this preferred embodiment, the process runs at a constant pressure within the flow tube.

It is also advantageous to cause an additional evaporation by expansion by adjusting the pressure in a separator arranged downstream of the flow tube to a value below the critical pressure associated with the sonic velocity in the tube outlet. For example, if the pressure at the exit of the flow tube is about 100 to 200 mbar, the adjusted pressure within the separator may be about 10 to 50 mbar.

The evaporation by expansion then takes place in a tube section into the separator, which leads to an enhanced degree of concentrating. The novel process is distinguished by low operating costs and little pollution of the environment. As a continuous process with a closed distillation, it requires only moderate forces and lower temperatures than a discontinuous process. Because of the high flow velocities and the large driving temperature gradients, the heat transfer is good. The residence time is short, which is particularly important if further polymerization is to be expected. The risk of crust formation is substantially reduced. The cleaning cycles become markedly longer and are carried out more rapidly. Moreover, there is no longer a risk of heaps of crust being built up, which can then only be removed by mining techniques. As compared with continuous alternative processes in a thin-layer evaporator, the novel process has more advantageous costs and is less susceptible to faults, since there are no rotating parts and a self-cleaning effect takes place.

Example 1

The apparatus used in this example is shown in FIG. 1 as the "first stage". In FIG.1, the "vapor exhaust" corresponds to the distillate outflow and the "sump outlet" corresponds to the bottom outflow. At 30 minute intervals the flow of starting solution was interrupted so that a 30 second flushing surge of water at about 150-300 kg/hour could be forced through the flow tube. The flushing water is not included in the mass balance set forth below.

| Starting solution: | | |
|---|---|---|
| Piperazine | 30 kg/hour | 10% by weight |
| Water | 252 kg/hour | 84% by weight |
| Waste (salts and resins) | 18 kg/hour | 6% by weight |
| Bottom outflow: | | |
| Piperazine | 1 kg/hour | |
| Water | 2 kg/hour | |
| Waste | 18 kg/hour | |
| Distillate outflow: | | |
| Piperazine | 29 kg/hour | |
| Water | 250 kg/hour | |

| Tube geometry: coiled jacketed tube | |
|---|---|
| Internal tube diameter | 29.7 mm |
| Wall thickness | 2 mm |
| Tube length | 18 m |
| Coil diameter | 1000 mm |
| Heat exchange area | 1.7 m$^2$ |
| Conditions of state at the tube outlet: | |
| Pressure | 1 bar |
| Temperature | 134° C. |
| Flow velocity | 150 m/second |
| Vapor fraction | 93% by weight |
| Heating medium: 16 bar steam | 195° C. |

Example 2 with intermediate filtration

The apparatus used in this example is shown in FIG. 1 (both the first stage and the second stage including the intermediate filter). However, no flushing was used in this example.

| Throughput: | 1000 kg/hour |
|---|---|
| Composition at the first stage tube inlet: | |
| Isopropanol | 67% by weight |
| Water | 16.5% by weight |
| Sodium methylenecaprolactam | 14% by weight |
| Salts | 2% by weight |
| Resins | 0.5% by weight |
| 1st stage: | |
| Tube geometry: | coiled jacketed tube |
| Internal diameter: | 60.3 mm |
| Wall thickness: | 2 mm |
| Length: | 30 m |
| Coil diameter: | 1200 mm |
| Heat exchange area: | 5.68 m$^2$ |
| Conditions of state at the first stage tube outlet | |
| Pressure: | 1 bar |
| Temperature | 120° C. |
| Flow velocity: | 100 m/s |
| Vapor fraction: | 80% by weight |
| Heating medium: 4 bar steam: | 145° C. |
| Bottom product composition at the first stage sump outlet (before filtering): | |
| Isopropanol | 21.6% by weight |
| Water | 4.2% by weight |
| Sodium methylenecaprolactam | 64.6% by weight |
| Heavy ends (salts and resins) | 9.6% by weight |
| 2nd stage: | |
| Tube geometry: | coiled jacketed tube |
| Internal diameter: | 33.7 mm |
| Wall thickness: | 2 mm |
| Length: | 20 m |
| Coil diameter: | 600 mm |
| Heat exchange area: | 2.12 m$^2$ |
| Coil pitch: | 15° |
| Conditions of state at the second stage tube outlet | |
| Pressure: | 500 mbar |
| Temperature | 200° C. |
| Vapor fraction: | 97% by weight |
| Heating medium: 30 bar steam: | 235° C. |

Composition at the inlet of the second stage (after filtering) and in the bottom of the second stage (residual sump outlet)

| | Inlet | Bottom |
|---|---|---|
| Isopropanol | 23.7% by weight | 0.3% by weight |
| Water | 4.6% by weight | 0.06% by weight |
| Sodium methylene-caprolactam | 70.4% by weight | 33.4% by weight |
| Heavy ends | 1.3% by weight | 66.3% by weight |

-continued

| | |
|---|---|
| (salts and resins) | |

Example 3 with intermediate filtration

This example refers to the processing of the residuals of chlorination of benzene, which contains solvents, still residuals of FeCl$_3$ and resins, which must be separated. It is the object to evaporate 597 kg/h from 600 kg/h of these residuals. After evaporation the sump from the second stage essentially consists of liquid resins and negligible amounts of residuals of the solvents, wherein the solid FeCl$_3$ is dispersed.

Figure 2:
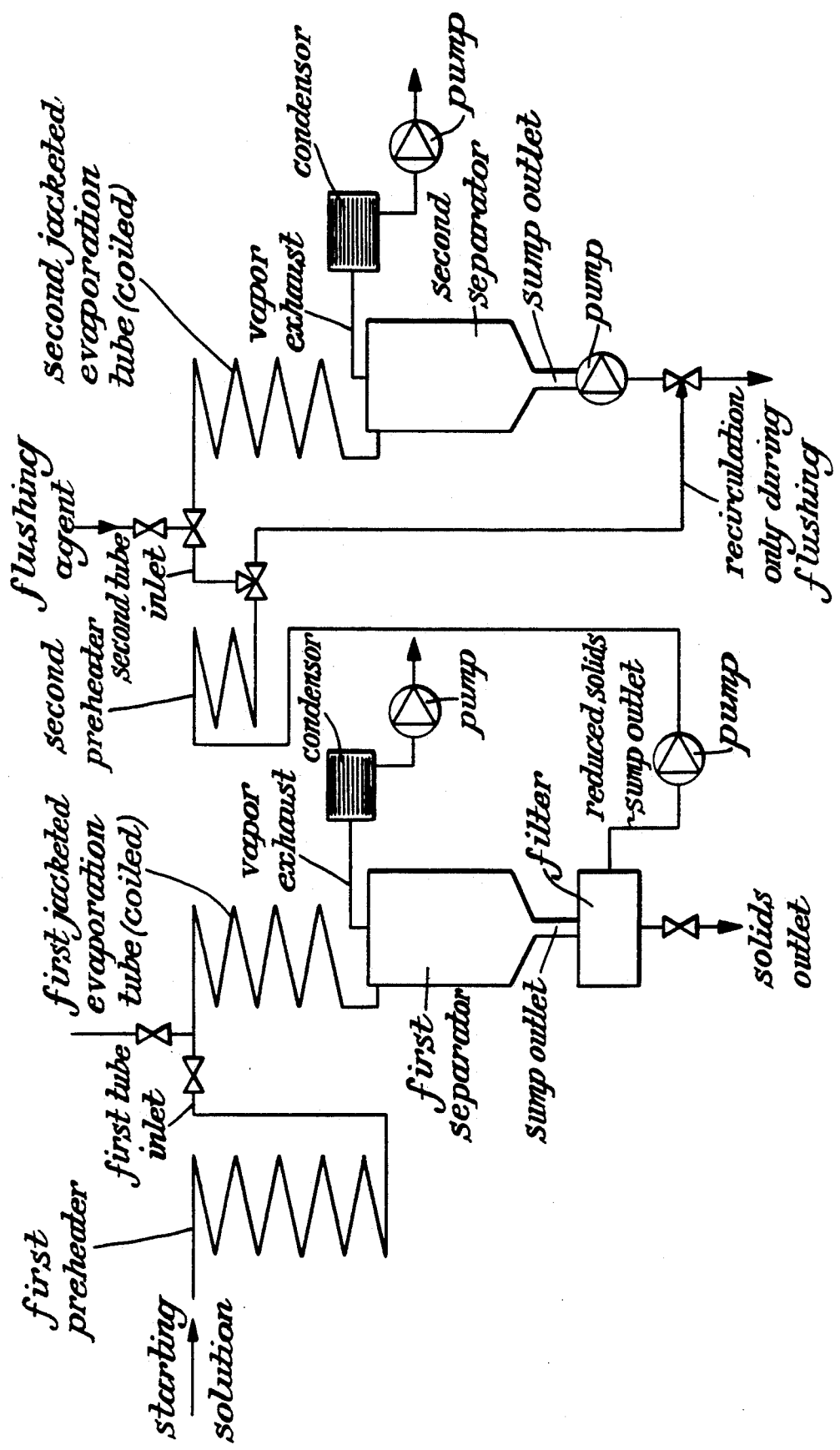

A two-stage apparatus with coiled jacketed tubes is used (see FIG. 2). In the first stage, 90% by weight of the product fed into the stage is evaporated. In the second stage, at least 90% by weight of the product fed into the stage is evaporated. The apparatus works without recirculation and there are no difficulties of wetting the inner surface of the tube walls. However, if any crusting occurs in the second stage, a short flush of about 50 sec with water in an amount of about 6 m$^3$/h will remove the crustings. If flushing is used, the heating is continued during the flushing step and the flushing water which flows to the sump outlet can be recirculated as shown in FIG. 2.

| Throughput: | 600 kg/hour |
|---|---|
| Composition at the first tube inlet: | |
| Chlorobenzene | 48.5% by weight |
| p-dichlorobenzene | 19.2% by weight |
| o-dichlorobenzene | 15.5% by weight |
| resin and FeCl$_3$ | 0.5% by weight |
| 1st stage: | |
| First preheater: | |
| Tube geometry | coiled jacketed tube |
| Internal diameter | 18.1 mm |
| Wall thickness | 1.0 mm |
| Length | 6.5 m |
| Coil diameter | 150 mm |
| Heat exchange area | 0.37 m$^2$ |
| Pitch | 15° |
| Conditions of state behind the first preheater: | |
| Pressure | 1 bar |
| Temperature | 190° C. |
| Flow velocity | 50 m/sec |
| Heating medium | steam 30 bar/ 230° C. |
| First evaporator (tube): | |
| Tube geometry | coiled jacketed tube |
| Internal diameter | 38.4 mm |
| Wall thickness | 2 mm |
| Length | 6 m |
| Coil diameter | 200 mm |
| Heat exchange area | 0.72 m$^2$ |
| Pitch | 15° |
| Conditions at the first tube outlet: | |
| Pressure | 1 bar |
| Temperature | 180° C. |
| Flow velocity | 50 m/sec |
| Vapor fraction | 90% by weight |
| Heating medium | steam 30 bar/ 230° C. |
| Sump product composition (at sump outlet before filter): | |
| Chlorobenzene | 28% by weight |
| p-dichlorobenzene | 34% by weight |
| o-dichlorobenzene | 33% by weight |
| resin and FeCl$_3$ (solids) | 5% by weight |

The sump product from the first stage is fed into a filter wherein a portion of the FeCl$_3$(solids) is removed. The reduced solids liquid sump product obtained after filtering is fed into the second stage for further concentration.

| 2nd stage: | |
|---|---|
| Second preheater: | |
| Tube geometry | coiled jacketed tube |
| Internal diameter | 10 mm |
| Wall thickness | 1 mm |
| Length | 4 m |
| Coil diameter | 150 mm |
| Heat exchange area | 0.04 m$^2$ |
| Pitch | 15° |
| Conditions of state at the second tube end: | |
| Pressure | 1 bar |
| Temperature | 190° C. |
| Flow velocity | 50 m/sec |
| Heating medium | steam 30 bar/ 230° C. |
| Second evaporator (tube): | |
| Tube geometry | coiled jacketed tube |
| Internal diameter | 21 mm |
| Wall thickness | 2 mm |
| Length | 1 m |
| Coil diameter | 150 mm |
| Heat exchange area | 0.1 m$^2$ |
| Pitch | 15° |
| Evaporated amount | 95% by weight |
| Sump composition: | |
| Resins and FeCl$_3$ (solids) | about 100% by weight |

The sump at the end of the second stage consists essentially of FeCl$_3$(solids) dispersed in a dominant phase of liquid resins and small amounts of residuals of the solvents.

What is claimed is:

1. A continuous process for concentrating a solution containing at least one vaporizable component and 1 to 10% by weight of salts and resins which comprises concentrating the solution in a single pass through a heat-jacketed single-tube apparatus having an inlet and an outlet, wherein the tube has a coiled geometry in at least the last third thereof and has a tube diameter selected whereby the mean flow velocity of the solution at the tube outlet is at least 50 meters/second, said process removing at least 90% by weight of the at least one vaporizable component to result in a concentrated liquid product by evaporating said vaporizable component of the solution in the tube by heating the tube with a heating medium wherein the temperature gradient between the heating medium and the solution is from 20° to 200° C.

2. The process of claim 1, wherein the velocity at the tube outlet is about the velocity of sound.

3. The process of claim 1, wherein the solution is pretreated by being first evaporated down to a thin mobile suspension, the salt is filtered off and the remaining liquid product is then concentrated further.

4. The process of claim 1, wherein with continued heating, a flushing step is performed by introducing a flushing agent at time intervals into the inlet of the single-tube apparatus and during said flushing step at least a portion of the flushing agent is evaporated within the single-tube apparatus.

5. The process of claim 4, wherein the flushing agent is at least one of water and steam.

6. The process of claim 4, wherein the process is interrupted during said flushing step.

7. The process of claim 1, wherein an additional evaporation by expansion is caused by adjusting the pressure in a separator arranged downstream of the single-tube apparatus to a value below the critical pressure of the solution having sonic velocity in the tube outlet.

8. The process of claim 2, wherein the solution is pretreated by being first evaporated down to a thin mobile suspension, the salt is filtered off and the remaining liquid product is then concentrated further.

9. The process of claim 2, wherein with continued heating, a flushing agent is briefly introduced at time intervals into the inlet of the single-tube apparatus and at least a portion of the flushing agent is evaporated within the single-tube apparatus.

10. The process of claim 3, wherein with continued heating, a flushing agent is briefly introduced at time intervals into the inlet of the single-tube apparatus and at least a portion of the flushing agent is evaporated within the single-tube apparatus.

11. The process of claim 2, wherein an additional evaporation by expansion is caused by adjusting the pressure in a separator arranged downstream of the single-tube apparatus to a value below the critical pressure of the solution having sonic velocity in the tube outlet.

12. The process of claim 3, wherein an additional evaporation by expansion is caused by adjusting the pressure in a separator arranged downstream of the single-tube apparatus to a value below the critical pressure of the solution having sonic velocity in the tube outlet.

13. The process of claim 4, wherein an additional evaporation by expansion is caused by adjusting the pressure in a separator arranged downstream of the single-tube apparatus to a value below the critical pressure of the solution having sonic velocity in the tube outlet.

14. A process for concentrating a solution containing at least one vaporizable component and 1 to 10% by weight of salts and resins which comprises a two stage process consisting of a first stage and a second stage wherein in the first stage at least a portion of the at least one vaporizable component is evaporated by passing the solution through a first jacketed evaporation tube having an inlet, an outlet and a coiled geometry in at least the last third thereof, further wherein a liquid phase comprising the resins and the at least one vaporizable component is dominant over any solid phase that is present throughout the first tube so that a liquid product containing precipitated salts exits the first tube outlet, the mean flow velocity of the solution at the outlet of the first tube is at least 50 meters/second and the solution exits the first tube outlet into a first separator which separates the at least one vaporizable component which has been evaporated from the liquid product containing precipitated salts, said liquid product is then drained from the first separator and filtered to separate at least a portion of the precipitated salts from a remaining liquid product comprising the at least one vaporizable component which was not evaporated in the first stage, said resins and the remainder of said salts, the remaining liquid product is then further concentrated by passing the remaining liquid product through said second stage which comprises a second jacketed evaporation tube having an inlet and an outlet and a coiled geometry in at least the last third thereof, wherein a liquid phase comprising the resins and the remaining at least one vaporizable component is dominant over any solid phase that is present throughout the second tube so that a liquid product exits the second tube outlet, further wherein said remaining liquid product from said first stage is passed through said second jacketed evaporation tube so that the mean flow velocity of the solution at the outlet of the second tube is at least 50 meters/second, the liquid product from the second tube exits the outlet of the second tube into a second separator which separates the at least one vaporizable component which has been evaporated in the second stage from a final liquid product, wherein said final liquid product contains said at least one vaporizable component in an amount which is less than 10% by weight of the original amount of said at least one vaporizable component which was present in said solution before said solution was passed through said first stage.

15. The process of claim 14, wherein at least 50% by weight of the at least one vaporizable component is evaporated in the first stage.

16. The process of claim 15, wherein a constant pressure is maintained in each of the first and second tubes.

17. The process of claim 14, wherein about 90% by weight of the at least one vaporizable component is evaporated in the first stage and wherein said final liquid product consists essentially of salts which are dispersed in a dominant phase of liquid resins and negligible amounts of residuals of said at least one vaporizable component.

18. The process of claim 14, wherein all of said at least one vaporizable component which has been evaporated in said first stage is separated from said liquid product in said first separator so that none of said at least one vaporizable component that has been evaporated is passed through said second stage.

19. A process for concentrating a starting solution containing at least one vaporizable component and 1 to 10% by weight of salts and resins which comprises at least three stages, wherein each stage comprises a jacketed evaporation tube and a separator, said jacketed evaporation tube having an inlet, an outlet and a coiled geometry in at least the last third thereof, further wherein at least a portion of said at least one vaporizable component is evaporated in a first stage of said at least three stages by passing said starting solution through a first evaporation tube so that the mean flow velocity of the solution at the outlet of the first tube is at least 50 meters/second which results in a liquid phase comprising the resins and the at least one vaporizable component being dominant over any solid phase that is present throughout the first tube so that a liquid product containing precipitated salts exits the first tube outlet into a first separator wherein the at least one vaporizable component that was evaporated in the first stage is separated from a liquid product containing precipitated salts which is passed through a filter located between the first stage and a second stage, said filter separating at least a portion of the precipitated salts from a remaining first stage liquid product which is then fed into a second evaporation tube so that the mean flow velocity of the remaining liquid product at the outlet of the second tube is at least 50 meters/second which results in a liquid phase comprising the resins and the remaining at least one vaporizable component being dominant over any solid phase that is present throughout the second tube so that a liquid product containing precipitated salts exits the second tube outlet into a second separator wherein the at least one vaporizable component that was evaporated in the second stage is separated from a liquid product containing precipitated salts which is passed through a filter located between the second stage and a third stage, said filter separating at least a portion of the precipitated salts from a remaining second stage liquid product which is then fed into a third evaporation tube in the same manner as described above for the first and second evaporation tubes and the evaporation, separation and filtering steps are continued in and between each additional stage until a liquid product exiting from a separator in the third or more stage contains said at least one vaporizable component in an amount which is less than 10% by weight of the original amount of said at least one vaporizable component which was present in said starting solution.

* * * * *